(12) United States Patent
Noh

(10) Patent No.: US 11,412,704 B2
(45) Date of Patent: Aug. 16, 2022

(54) METHOD FOR DISCHARGING PET EXCREMENT BY PET EXCREMENT DEVICE

(71) Applicant: PurrSong, Inc., Daejeon (KR)

(72) Inventor: Tae Gu Noh, Suwon-si (KR)

(73) Assignee: PurrSong, Inc., Daejeon (KR)

( * ) Notice: Subject to any disclaimer, the term of this patent is extended or adjusted under 35 U.S.C. 154(b) by 203 days.

(21) Appl. No.: 16/851,600

(22) Filed: Apr. 17, 2020

(65) Prior Publication Data
US 2020/0236896 A1 Jul. 30, 2020

Related U.S. Application Data

(63) Continuation of application No. PCT/KR2017/011503, filed on Oct. 18, 2017.

(51) Int. Cl.
*A01K 1/01* (2006.01)
*A01K 29/00* (2006.01)

(52) U.S. Cl.
CPC ............ *A01K 1/011* (2013.01); *A01K 29/005* (2013.01)

(58) Field of Classification Search
CPC ..... A01K 1/0114; A01K 1/011; A01K 29/005
USPC .......................... 119/161, 163, 165, 166, 168
See application file for complete search history.

(56) References Cited

U.S. PATENT DOCUMENTS

| 5,048,464 | A | * | 9/1991 | Shirley | A01K 1/0114 119/166 |
| 5,107,797 | A | * | 4/1992 | LaRoche | A01K 1/0114 119/163 |
| 5,622,140 | A | * | 4/1997 | McIlnay-Moe | A01K 1/0114 119/166 |
| 5,662,066 | A | * | 9/1997 | Reitz | A01K 1/0114 119/163 |

(Continued)

FOREIGN PATENT DOCUMENTS

| CN | 105638488 A | 6/2016 |
| JP | 2000069875 A | 3/2000 |

(Continued)

OTHER PUBLICATIONS

International Search Report of PCT/KR2017/011503 dated Jul. 6, 2018.

(Continued)

*Primary Examiner* — Yvonne R Abbott-Lewis
(74) *Attorney, Agent, or Firm* — Dinsmore & Shohl LLP; Yongsok Choi, Esq.

(57) ABSTRACT

The present invention relates to a device for pet excrement. The device senses a presence of a pet, determines whether a rotary unit is operating in response to the sensing of the presence of the pet, determines whether a weight equal to or greater than a first set value is applied to a load cell when the rotary unit is not operating, determines whether a weight equal to or less than the first set value is applied to the load cell when a weight equal to or greater than the first set value is applied to the load cell, and operates the rotary unit when (Continued)

a weight equal to or less than the first set value is applied to the load cell. According to the present invention, excrement removal, solid material supply, and excrement accommodation can be automatically performed by simply rotating a rotary unit.

4 Claims, 11 Drawing Sheets

(56) References Cited

U.S. PATENT DOCUMENTS

| | | | | |
|---|---|---|---|---|
| 6,126,015 | A * | 10/2000 | Haymaker | A01K 1/0114 119/166 |
| 6,701,868 | B1 | 3/2004 | Shepherd | |
| 7,017,519 | B1 * | 3/2006 | Deasy | A01K 1/011 119/166 |
| 8,109,237 | B1 * | 2/2012 | Tsengas | A01K 1/0114 119/166 |
| 9,433,185 | B2 * | 9/2016 | Baxter | A01K 1/0114 |
| 2002/0139312 | A1 * | 10/2002 | Reitz | A01K 1/0114 119/165 |
| 2003/0217700 | A1 * | 11/2003 | Northrop | A01K 1/0114 119/166 |
| 2007/0056520 | A1 | 3/2007 | Hamada | |
| 2007/0227457 | A1 * | 10/2007 | Waters | A01K 1/0114 119/166 |
| 2008/0017123 | A1 * | 1/2008 | Chin | A01K 1/0114 119/166 |
| 2011/0315084 | A1 * | 12/2011 | Miller | A01K 1/011 119/166 |
| 2013/0333625 | A1 * | 12/2013 | Baxter | A01K 1/011 119/166 |
| 2014/0245960 | A1 | 9/2014 | Baxter et al. | |

FOREIGN PATENT DOCUMENTS

| | | |
|---|---|---|
| JP | 4429270 B2 | 3/2010 |
| KR | 1020120045187 A | 5/2012 |
| KR | 1020140138532 A | 12/2014 |
| KR | 1020160085451 A | 7/2016 |
| KR | 1020170034743 A | 3/2017 |
| WO | 2004103069 A1 | 12/2004 |

OTHER PUBLICATIONS

European Extended Search Report for EP Application No. 17928981.4 dated May 10, 2021 (7 pages).

* cited by examiner ature of the present invention is to provide a method for effectively processing pet excrement using a device for pet excrement which is configured to easily and automatically remove excrement by simply rotating a rotary unit.

METHOD FOR DISCHARGING PET EXCREMENT BY PET EXCREMENT DEVICE

CROSS-REFERENCE TO RELATED APPLICATION

This application is a continuation of International Application No. PCT/KR2017/011503 filed on Oct. 18, 2017, the entire contents of which are herein incorporated by reference.

TECHNICAL FIELD

The present invention relates to a method for discharging pet excrement by using a pet excrement device, and more particularly, to a method for effectively discharging pet excrement by using a pet excrement device.

BACKGROUND

The number of households that raise pets, especially cats, is increasing greatly, and various devices for raising cats have been developed.

Korean Patent Application Publication No. 10-2014-0138532 discloses a cat toilet. The cat toilet disclosed in the publication is configured such that a cat can defecate in a cylindrical housing which is provided with an openable door to allow a cat to enter and exit and in which a solid material is contained. The cat toilet disclosed in the publication is configured such that when excrement is accumulated, a cat owner rotates the cylindrical housing by holding a handle to separate the excrement from the solid material with a screening net member installed inside the cylindrical housing and discharge the excrement to an excrement collecting bin through an excrement tray.

The invention disclosed in the publication has problems in that direct involvement of a user is needed to remove excrement, and the overall structure of the device is complex to cause high manufacturing costs and difficult maintenance.

SUMMARY

Problems to be Solved by the Invention

To solve the above-described problems, an object of the present invention is to provide a method for effectively processing pet excrement using a device for pet excrement which is configured to easily and automatically remove excrement by simply rotating a rotary unit.

Means for Solving the Problems

The object of the present invention is achieved by a method for processing pet excrement using a device for pet excrement, the method including: a sensing step of sensing a pet; when a pet is sensed in the first sensing step, a first determining step of determining whether a rotary unit is operating: when it is determined, in the first determining step, that the rotary unit is not operating, a second determining step of determining whether a weight equal to or greater than a first set value is applied to a load cell; when it is determined, in the second determining step, that a weight equal to or greater than the first set value is applied to the load cell, a third determining step of determining whether a weight equal to or less than the first set value is applied to the load cell; and when it is determined, in the third determining step, that a weight equal to or less than the first set value is applied to the load cell, an operating step of operating the rotary unit.

In addition, when no pet is sensed in the sensing step, the method of the present invention may further include a supplying step of supplying a solid material to a bed unit when a weight equal to or less than a second set value is applied to the load cell.

In addition, when it is determined, in the first determining step, that the rotary unit is operating, the method of the present invention may further include a controlling step of moving the rotary unit to a base position.

In addition, the sensing step may be performed using infrared rays.

In addition, the operating step may be performed after a period of time equal to or longer than a third set value.

Effects of the Invention

According to the present invention, there is an effect in that excrement removal, solid material supply, and excrement accommodation can be automatically performed by simply rotating a rotary unit. Therefore, the effect of effectively and easily removing pet excrement may be obtained.

DETAILED DESCRIPTION

Figure 1:
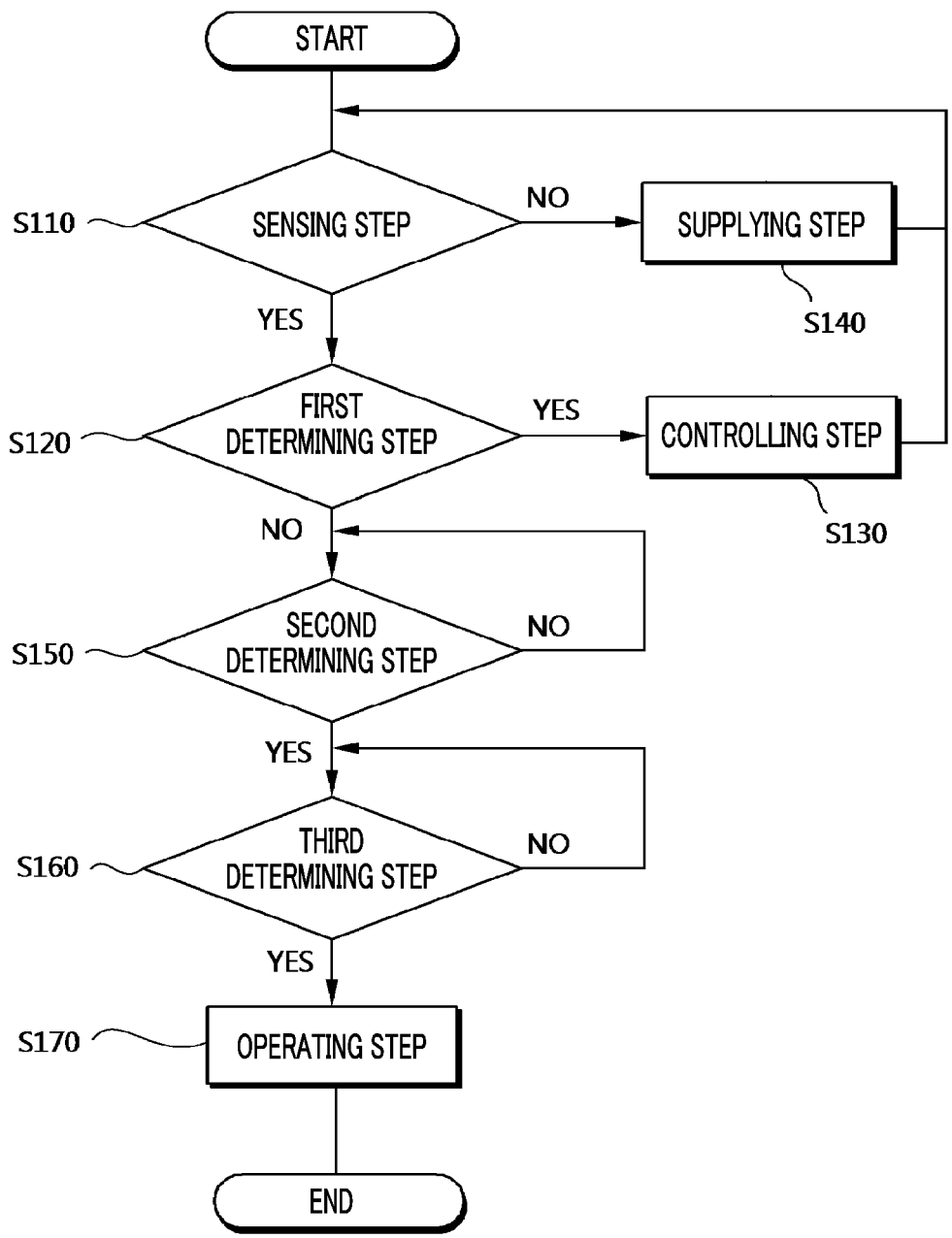
FIG. 1 is a flowchart illustrating a method for processing pet excrement using a pet excrement device according to an embodiment of the present invention.

Hereinafter, some embodiments of the present invention will be described in detail with reference to the exemplary drawings. When allocating reference numerals to elements in the drawings, if possible, like elements are denoted with like reference numerals even though the elements are illustrated in different drawings.

Moreover, in the following descriptions of the embodiments of the present invention, detailed descriptions related to well-known configurations or functions will be ruled out in order not to unnecessarily interrupt understanding of the embodiments of the present invention.

In addition, when describing elements of the embodiments of the present invention, terms or letters such as first, second, A, B, (a), and (b) may be used. These terms or letters are only for distinguishing one element from another element, and the nature and order or sequence of elements are not limited by the terms or letters.

First, a pet excrement device, which is used for a method for processing pet excrement, will be described in detail with reference to the accompanying drawings according to embodiments of the present invention.

Figure 2:
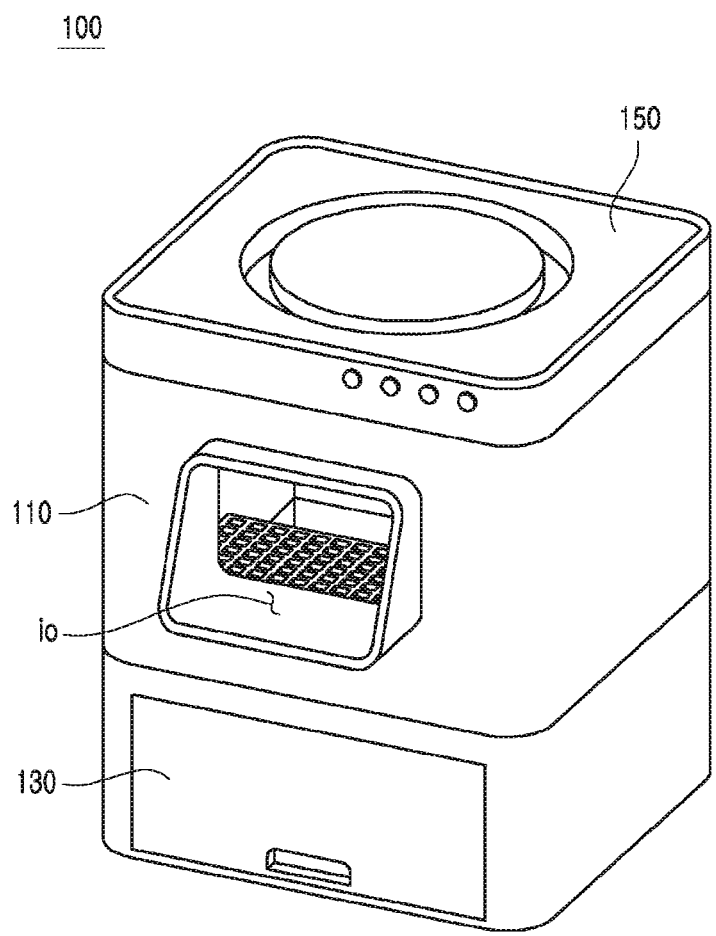
FIG. 2 is an overall view illustrating the pet excrement device according to an embodiment of the present invention.
Figure 3:
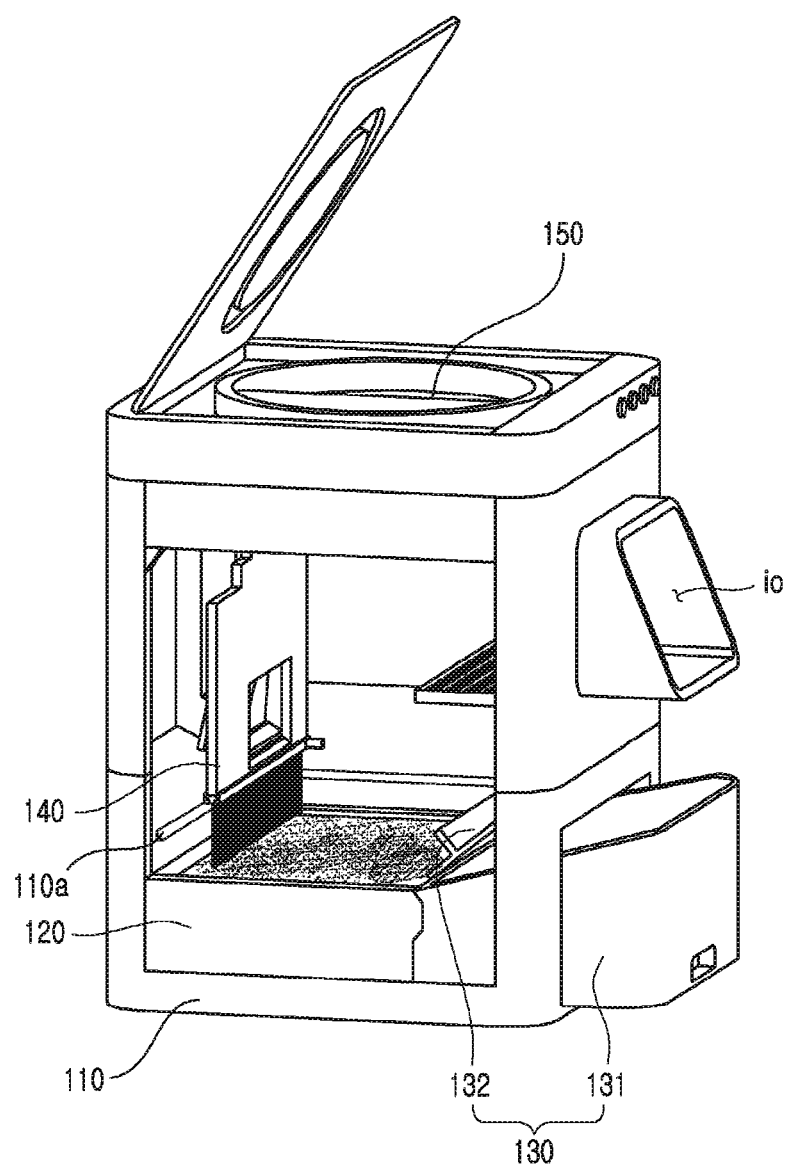
FIG. 3 is an overall views illustrating the pet excrement device according to an embodiment of the present invention.
Figure 4:
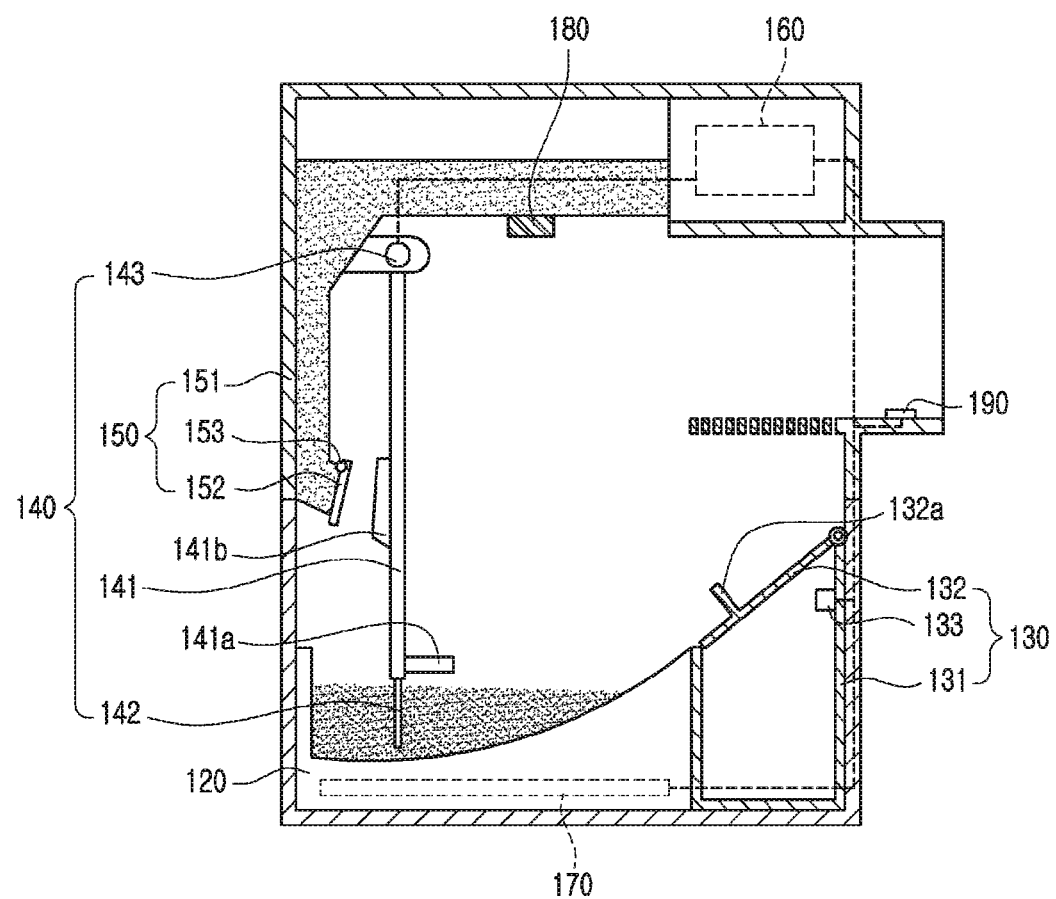
FIG. 4 is a side cross-sectional view illustrating the pet excrement device according to an embodiment of the present invention.
Figure 5:
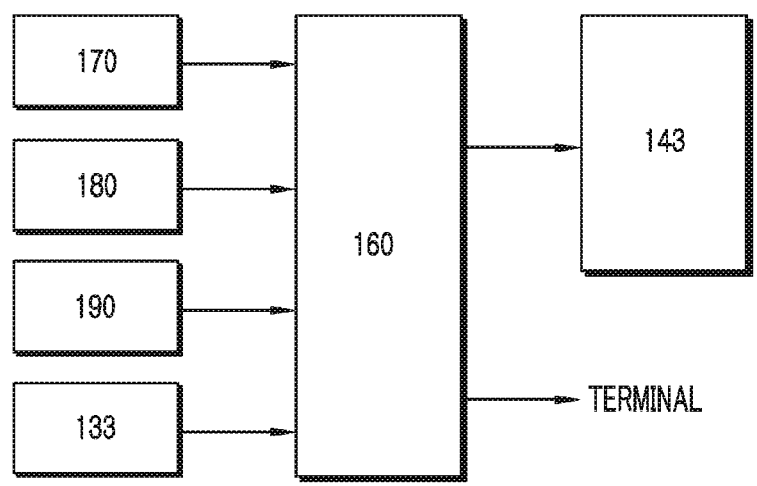
FIG. 5 is a view illustrating electrical connection between elements of the pet excrement device according to an embodiment of the present invention.
Figure 6:
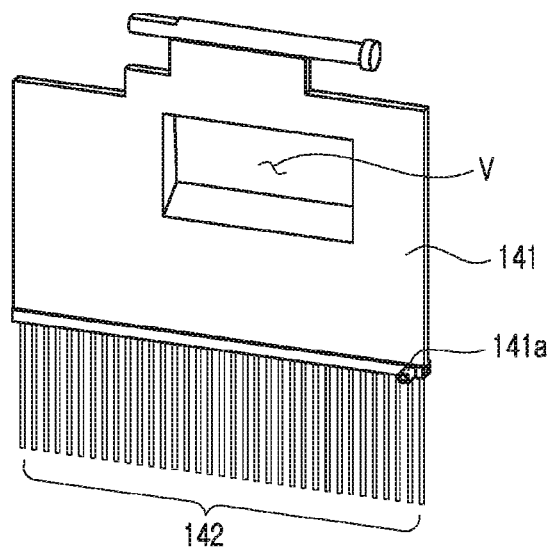
FIG. 6 is an overall view illustrating a rotary unit of the pet excrement device according to an embodiment of the present invention.
Figure 7:
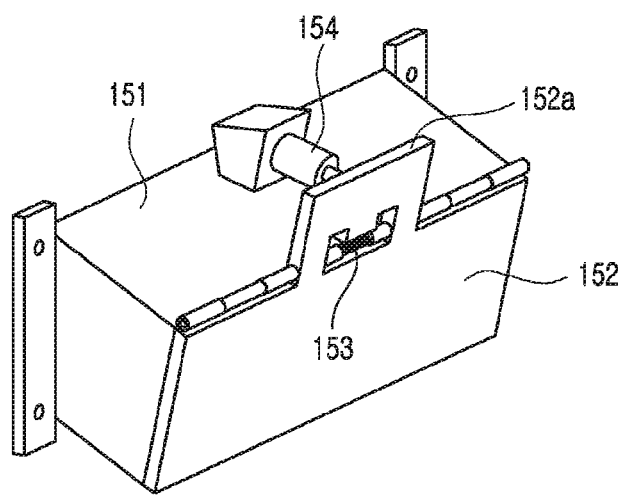
FIG. 7 is a detailed view illustrating a supply unit of the pet excrement device according to an embodiment of the present invention.

FIGS. 2 and 3 are overall views illustrating a pet excrement device according to an embodiment of the present invention: FIG. 4 is a side cross-sectional view illustrating the pet excrement device according to an embodiment of the present invention: FIG. 5 is a view illustrating electrical connection between elements of the pet excrement device according to an embodiment of the present invention; FIG. 6 is an overall view illustrating a rotary unit of the pet excrement device according to an embodiment of the present invention; and FIG. 7 is a detailed view illustrating a supply unit of the pet excrement device according to an embodiment of the present invention.

Referring to FIGS. 2 to 11, according to an embodiment of the present invention, a pet excrement device 100, which is used for a method for processing pet excrement, includes a case unit 110, a bed unit 120, an accommodation unit 130, a rotary unit 140, a supply unit 150, a control unit 160, a load cell unit 170, an entrance-exit sensing unit 180, and a reader unit 190.

The case unit 110 has an entrance (io) communicating with an inner space such that a pet can enter and exit the inner space, and the bed unit 120, the accommodation unit 130, the rotary unit 140, the supply unit 150, the control unit 160, the load cell unit 170, the entrance-exit sensing unit 180, and the reader unit 190, which are described later, are installed in the case unit 110.

It is preferable that a protruding line 110a be formed on an outer surface of the case unit 110 forming the inner space so as to prevent a solid material from being placed between the bed unit 120 (described later) and the outer surface of the case unit 110 forming the inner space.

In addition, when the bed unit 120 is attached to or detached from the case unit 110, the position of the rotary unit 140 (described later) is a problem. The reason for this is that when the rotary unit 140 is placed at a first position P1 or a second position P2, the rotary unit 140 interferes with the bed unit 120.

As shown in FIGS. 2 and 3, a plurality of buttons may be formed on an upper side of the case unit 110 to control the rotary unit 140 (described later), and due to the above-mentioned interference problem, it is preferable that any one of the buttons be provided to control the control unit 160 so as to place the rotary unit 140 at a third position P3.

As described above, when a user presses a button formed on the case unit 110, the rotary unit 140 may be immediately placed at the third position P3. Then, the bed unit 120 may be easily attached and detached without interference.

The bed unit 120 forms a defecation space for a pet to defecate therein and is installed in the inner space of the case unit 110.

The defecation space contains a certain amount of a solid material which is ordinary sand. Therefore, a pet (especially a cat) may defecate on the solid material.

In addition, the load cell unit 170 for sensing a weight loaded in the defecation space (described later) is installed on a lower side of the bed unit 120. The load cell unit 170 can be used for determining whether a pet is in the defecation space and whether a pet has defecated in the defecation space.

The accommodation unit 130, forming a first accommodation space which accommodates pet's excrement, includes a first housing 131, a first lid 132, and a height sensing unit 133.

A first opening is formed in the first housing 131 forming the first accommodation space as described above, such that the first accommodation space and the defecation space may communicate with each other through the first opening.

When a base 141 is placed at the second position P2 by the rotation of a motor 143 (described later), the first lid 132 (described later) opens the first opening such that excrement swept by sweeping parts 142 may be moved and accommodated in the first accommodation space.

In addition, it is preferable that the first housing 131 be detachably installed in a side of the case unit 110 for easily discharging excrement to the outside.

The first lid 132 is for opening the first opening to connect the first accommodation space and the defecation space to each other when the rotary unit 140 is rotated to the second position P2, and the first lid 132 is rotatably installed on the first housing 131 or the case unit 110.

The second lid 152 includes the second protrusion 152a configured to be rotated by contact with the second protruding portion 141b when the rotary unit 140 is rotated to the third position P3.

Owing to the contact between the first protrusion 132a and the first protruding portion 141a, the first opening can be opened by only the rotation of the rotary unit 140 without using an additional driving means, and thus excrement may be effectively accommodated in the first accommodation space.

The height sensing unit 133 is for sensing the height of excrement accommodated in the first accommodation space, and is installed in the first accommodation space in electrical connection with the control unit 160 (described later).

When the height sensing unit 133 senses that the height of excrement accommodated in the first accommodation space is greater than or equal to a preset height, the height sensing unit 133 transmits a signal to the control unit 160. Then, the control unit 160 notifies a user's terminal that excrement is accommodated in the first accommodation space to a height equal to or greater than the preset height, and thus the user may take action to remove the excrement to the outside.

The rotary unit 140 is installed in the case unit 110 and is rotatable in the defecation space, such that after a pet defecates on the solid material contained in the defecation space and leaves the case unit 110 in a state in which the rotary unit 140 is placed in the first position P1, the rotary unit 140 may be rotated to the second position P2 to move excrement from the defecation space to the first accommodation space.

In more detail, the rotary unit 140 includes the base 141, the sweeping parts 142, and the motor 143.

The base 141 is provided in a flat plate shape with a side coupled to the motor 143, wherein the first protruding portion 141a protrudes from a surface of the base 141, and a second protruding portion 141b protrudes the opposite surface of the base 141.

When the base 141 is placed at the second position P2 as the motor 143 (described later) rotates in one direction, the first protruding portion 141a is brought into contact with the first protrusion 132a, and then the first lid 132 is moved by the contact, thereby opening the first opening.

When the base 141 is placed at the third position P3 as the motor 143 (described later) rotates in the opposite direction, the second protruding portion 141b is brought into contact with a second protrusion 152a, and thus a second lid 152 is moved by the contact, thereby opening a second opening.

In addition, a guide space V is formed in a portion of the base 141 facing the second opening such that when the rotary unit 140, that is, the base 141, is placed at the third position P3, the guide space V may guide an introduction path through which the solid material is introduced into the defecation space from the second opening.

In this case, it is preferable that a lower surface of the base 141 forming the guide space V be provided as an inclined surface to improve the efficiency of guiding the solid material.

In addition, the sweeping parts 142 (described later) are provided side by side on a lower side of the base 141.

In addition, a rotation shaft portion of the base 141 may be inserted into the case unit 110 by a compression-spring-type method. Owing to this structure of the base 141, the user may easily attach and detach the base 141 to and from the case unit 110 by pressing the rotation shaft portion of the base 141 to compress a compression spring.

The sweeping parts 142 are provided side by side on the lower side of the base 141 and may be rotated by the rotation of the motor 143 to make contact with excrement placed on the solid material and sweep the excrement into the first accommodation space.

The motor 143 is configured to rotate according to a command of the control unit 160 (described later) so as to rotate the base 141, and is coupled to a side of the base 141.

The supply unit 150 is installed in an upper side of the case unit 110 to form a second accommodation space accommodating the solid material, and when the rotary unit 140 is rotated from the second position P2 to the third position P3, the supply unit 150 supplies the solid material from the second accommodation space to the defecation space.

In more detail, the supply unit 150 includes a second housing 151, the second lid 152, elastic parts 153 and 154, and a sensing module (not shown).

The second housing 151 forms the second accommodation space, and the second opening through which the second accommodation space and the epitaxial substrate communicate with each other is formed in the second housing 151.

When the rotary unit 140 is rotated to the third position P3 by the rotation of the motor 143, the second lid 152 (described later) is brought into contact with the second protruding portion 141b and is thus rotated, thereby opening the second opening. Since the second opening is opened according to the above-mentioned process, the solid material contained in the second accommodation space is introduced into the defecation space.

In addition, the second housing 151 may include a groove (g) formed along edge portions thereof for preventing inclusion of the solid material. The groove (g) effectively prevents the problem in which the solid material leaks because the second opening is not be completely closed when the solid material is interposed between the second housing 151 (described later) and the second lid 152.

The second lid 152 is for opening the second opening to connect the second accommodation space and the defecation space to each other when the rotary unit 140 is rotated to the third position P3, and the second lid 152 is rotatably installed on the second housing 151.

The second lid 152 includes the second protrusion 152a configured to be rotated by contact with the second protruding portion 141b when the rotary unit 140 is rotated to the third position P3.

Owing to the contact between the second protrusion 152a and the second protruding portion 141b, the second opening can be opened by only the rotation of the rotary unit 140 without using an additional driving means, and thus the solid material may be effectively supplied to the second accommodation space.

In addition, the second lid 152 is not limited to the above-described rotation type and may be of any type such as a sliding type as long as the second lid 152 is capable of opening the second opening.

Figure 9:
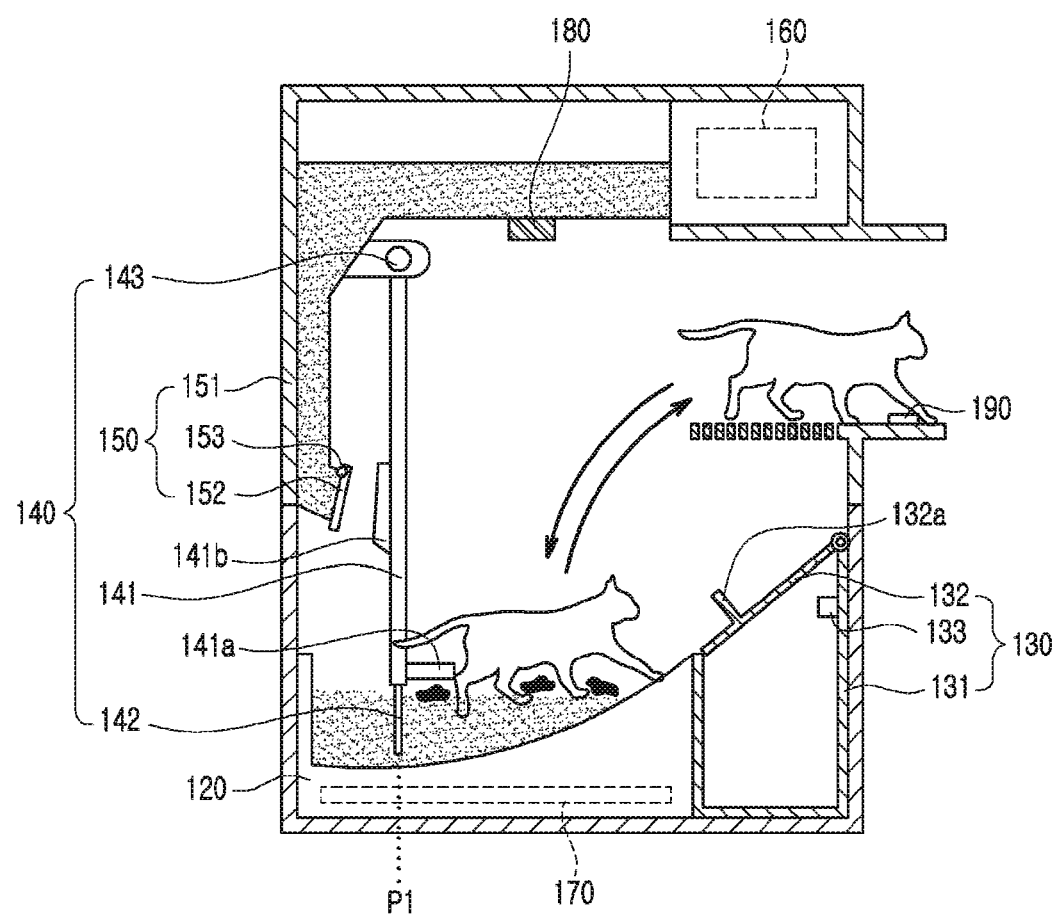
FIG. 9 is a view illustrating first to third determining steps of the method for processing pet excrement using the pet excrement device according to an embodiment of the present invention.

The elastic parts 153 and 154 provide elastic force to the second lid 152 to reversely rotate the second lid 152, and as shown in FIG. 9, the elastic parts 153 and 154 respectively include a torsion spring 153 and a compression spring 154 which are installed on the second housing 151.

Owing to the elastic parts 153 and 154, when the contact between the second lid 152 and the rotary unit 140 is released after the second lid 152 is opened to open the second opening, the second lid 152 is reversely rotated such that the second opening can be closed again.

The sensing module (not shown), which is for sensing the amount of the solid material accommodated in the second accommodation space, may be installed on the second housing 151 and may electrically connected to the control unit 160 (described later).

When the amount of the solid material accommodated in the second accommodation space decreases to a preset level or less, the sensing module (not shown) senses this and transmits a signal to the control unit 160. Thereafter, the control unit 160, which has received the signal, transmits information to the user's terminal to report that it is necessary to replenish the second accommodation space with the solid material. The user may check the information through the dedicated application installed on the terminal. Owing to this process with the sensing module (not shown), the user may easily recognize that the second accommodation space is needed to be replenished with the solid material.

In addition, the sensing module (not shown) may be, but is not limited to, a load cell or an infrared sensor, or any other device capable of sensing the amount of the solid material accommodated in the second accommodation space.

The control unit 160, which is for controlling the operation of the rotary unit 140, is installed in the case unit 110 and is electrically connected to the motor 143.

The control unit 160 controls the operation of the rotary unit 140, that is, the motor 143 based on weight information transmitted from the load cell unit 170 (described later) and IN/OUT information transmitted from the entrance-exit sensing unit 180 (described later).

In more detail, when it is determined, based on the weight information and the IN/OUT information, that a pet enters from the outside through the entrance (io), the control unit 160 moves the rotary unit 140 to the first position P1. Subsequently, when the pet leaves the case unit 110 through the entrance (io) after defecation, the control unit 160 senses this based on weight information and IN/OUT information and moves the rotary unit 140 to the second position P2 to move excrement into the first accommodation space. Thereafter, the control unit 160 moves the rotary unit 140 to the third position P3 to supply the solid material to the defecation space.

The load cell unit 170 is for generating weight information by sensing a weight loaded in the defecation space, and is installed below a defecation area.

The weight information generated by the load cell unit 170 is transmitted to the control unit 160 and is used by the control unit 160 to control the motor 143.

In addition, information such as the weight of excrement, the number of defecations, and the time of defecation of a pet may be additionally sensed using the load cell unit 170.

Such information sensed using the load cell unit 170 is transmitted to the control unit 160, and then the control unit 160 transmits the information to the user's terminal. The user may check the information through the dedicated application installed on the terminal. Owing to the process in which the load cell unit 170 transmits information about defecation, there is an effect that the user can easily recognize various conditions of a pet based on defecation of the pet.

In addition, the load cell unit 170 may be of a hydraulic type, a pneumatic type, a strain gauge type, or the like, but is not limited thereto&&& That is, the load cell unit 170 may be of any type capable of generating weight information by sensing a weight loaded in the defecation space.

The entrance-exit sensing unit 180 is for generating IN/OUT information by sensing the entrance and exit of a pet, and is installed in the case unit 110 at a side of the entrance (io).

The entrance-exit sensing unit 180 may be, but is not limited to, an infrared sensor, or any other device capable of generating IN/OUT information by sensing the entrance and exit of a pet.

Meanwhile, the IN/OUT information generated by the entrance-exit sensing unit 180 is transmitted to the control unit 160 and is used by the control unit 160 to control the motor 143.

The reader unit 190 is an RFID reader installed on the case unit 110 at a side of the entrance (io), and when a pet enters or exits, the reader unit 190 reads information from a tag attached to the pet.

Information such as IN/OUT information, the weight of excrement, the number of defecations, or the time of defecation may be generated for each tag by using such tag information, and the generated information may be provided to the user through the dedicated application installed on the terminal.

When several pets are raised, the kinds of pets entering and exiting the pet excrement device can be distinguished, and thus the state of defecation may be effectively monitored according to the kinds of pets.

As described above, according to the embodiments of the present invention, the pet excrement device 100, which is used for a method for processing pet excrement and includes the case unit 110, the bed unit 120, the accommodation unit 130, the rotary unit 140, the supply unit 150, the control unit 160, the load cell unit 170, the entrance-exit sensing unit 180, and the reader unit 190, may provide the effect of automatically removing excrement, supplying a solid material, and accommodating excrement by simply rotating the rotary unit 140. Thus, the involvement of a user may not be needed for removing excrement, and the pet excrement device may have a simple structure such that merits such as low manufacturing costs and low maintenance costs may be obtained.

Hereinafter, a method for processing pet excrement using the pet excrement device will be described in detail with reference to the accompanying drawings according to embodiments of the present invention.

Figure 8:
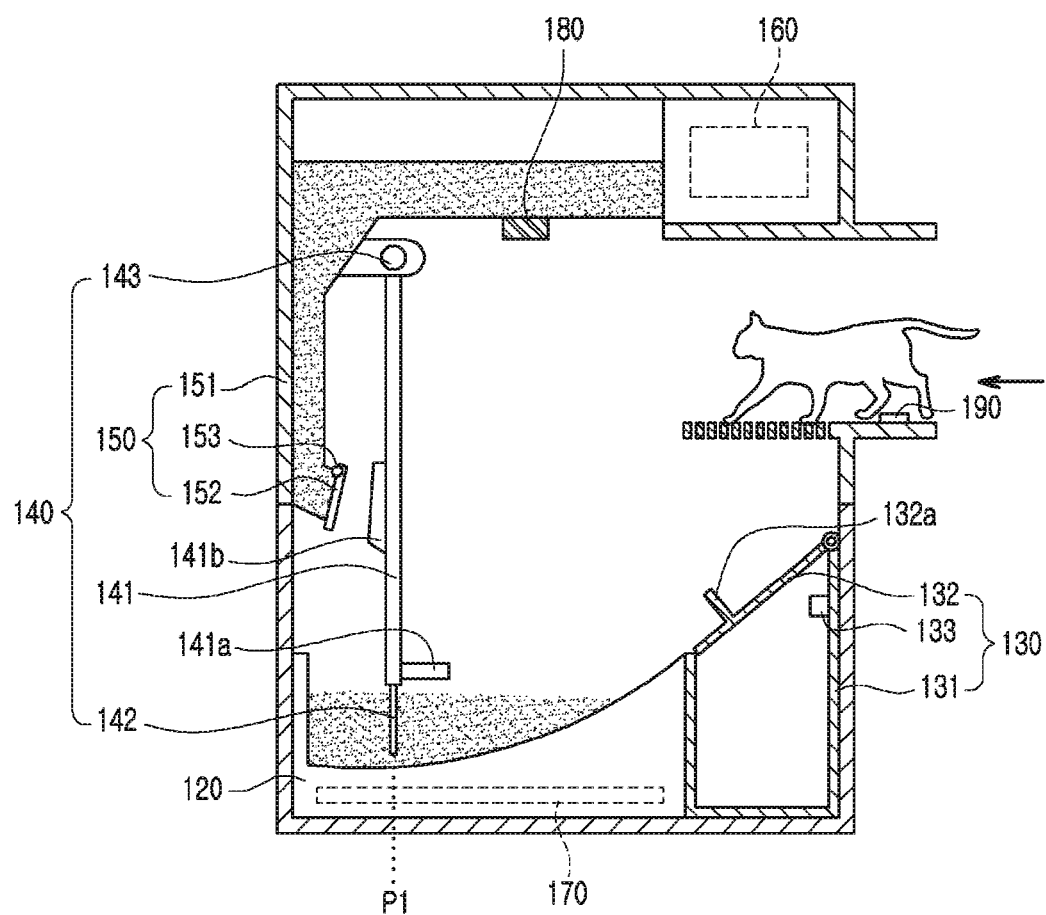
FIG. 8 is a view illustrating a sensing step of the method for processing pet excrement using the pet excrement device according to an embodiment of the present invention.
Figure 10:
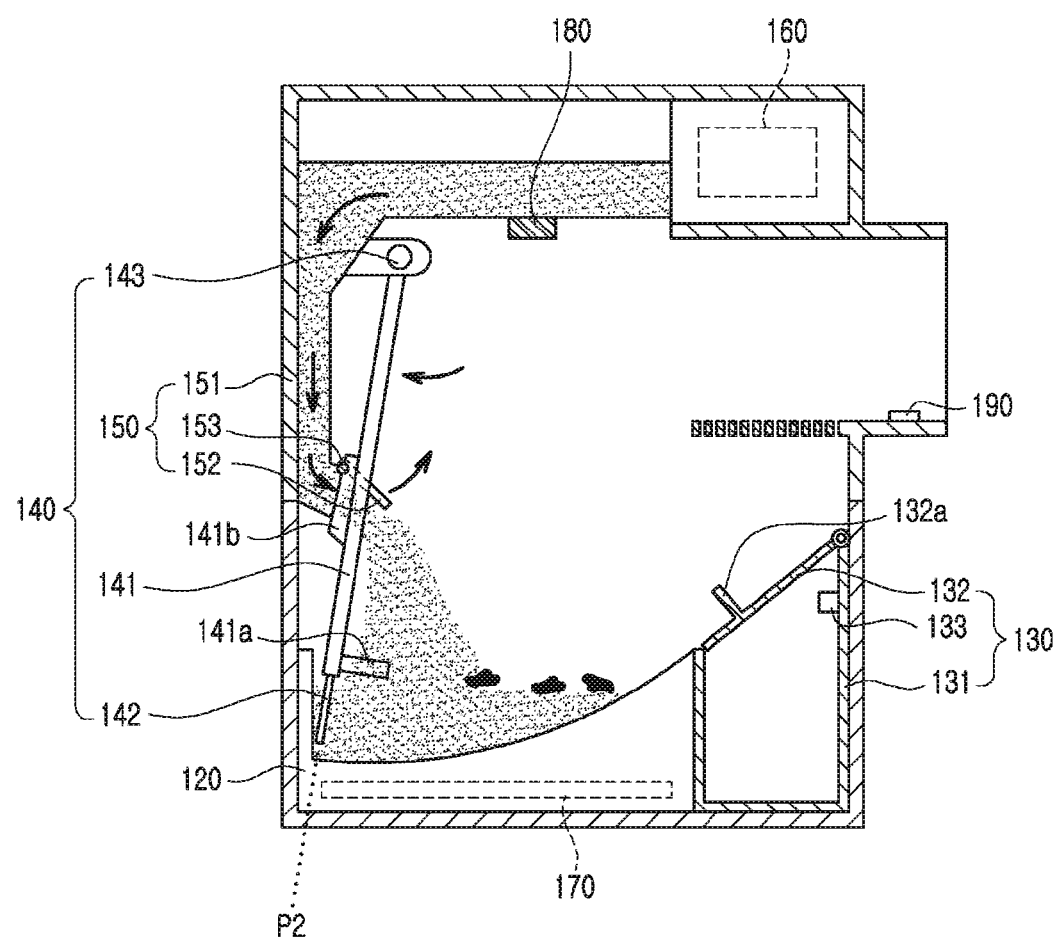
FIG. 10 is a view illustrating a supplying step of the method for processing pet excrement using the pet excrement device according to an embodiment of the present invention.
Figure 11:
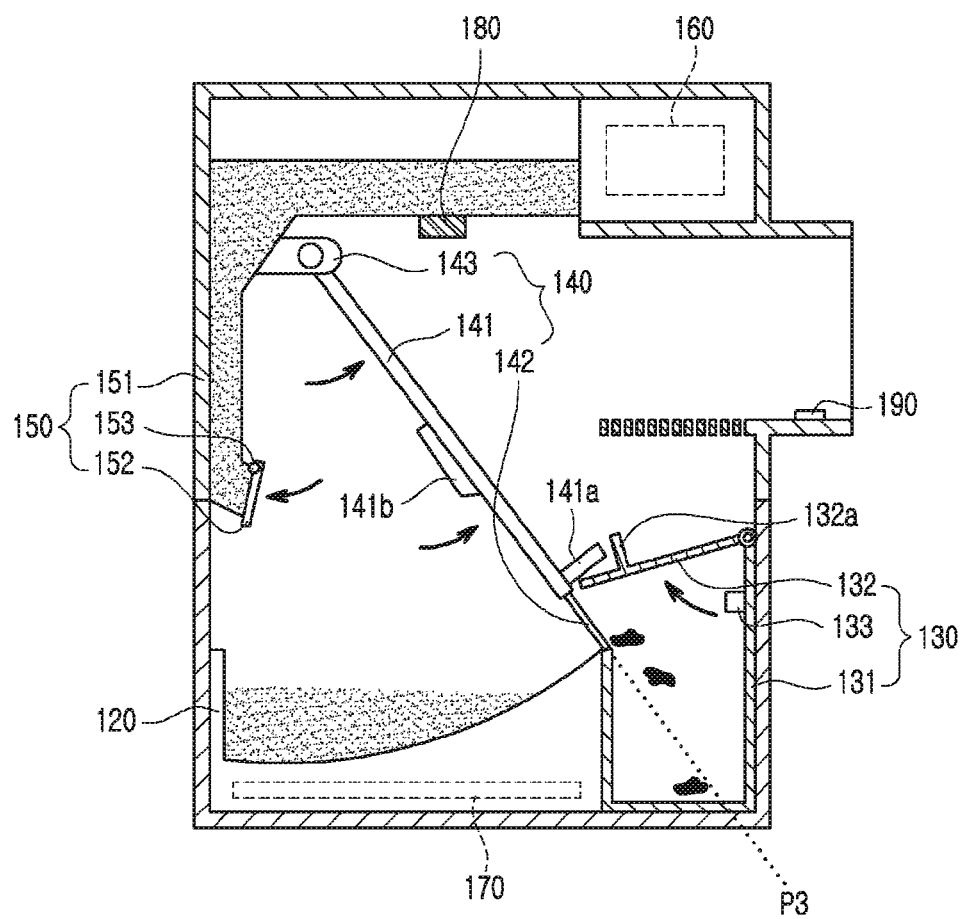
FIG. 11 is a view illustrating an operating step of the method for processing pet excrement using the pet excrement device according to an embodiment of the present invention.

FIG. 1 is a flowchart illustrating a method for processing pet excrement using the pet excrement device according to an embodiment of the present invention; FIG. 8 is a view illustrating a sensing step of the method for processing pet excrement using the pet excrement device according to an embodiment of the present invention; FIG. 9 is a view illustrating first to third determining steps of the method for processing pet excrement using the pet excrement device according to an embodiment of the present invention; FIG. 10 is a view illustrating a supplying step of the method for processing pet excrement using the pet excrement device according to an embodiment of the present invention; and FIG. 11 is a view illustrating an operating step of the method for processing pet excrement using the pet excrement device according to an embodiment of the present invention.

Referring to FIG. 1, according to an embodiment of the present invention, a method S100 for processing pet excrement using the pet excrement device includes a sensing step S110, a first determining step S120, a controlling step S130, a supplying step S140, a second determining step S150, a third determining step S160, and an operating step S170.

As shown in FIG. 8, the sensing step S110 is a step of sensing a pet and is performed by the entrance-exit sensing unit 180. In the sensing step S110, if it is sensed that a pet is inside the case unit 110, the entrance-exit sensing unit 180 generates a sensing signal and transmits the sensing signal to the control unit 160.

In the sensing step S110 which is performed using the entrance-exit sensing unit 180, a pet may be sensed by various methods, preferably an infrared ray method by considering sensing efficiency and economical aspects.

If a pet is sensed in the first sensing step S110, the first determining step S120 is performed by the control unit 160 to determine whether the rotary unit 140 is operating.

The operation of the rotary unit 140 should be performed only when there is no pet. Therefore, after the first sensing step S110, the control unit 160 determines, based on an electrical signal transmitted from the rotary unit 140, whether the rotary unit 140 is operating.

In the first determining step S120, if it is determined that the rotary unit 140 is operating, it is necessary to stop the operation of the rotary unit 140 and move the rotary unit 140 to a base position, that is, the first position P1, and thus the controlling step S130 (described later) is performed.

Furthermore, if it is determined, in the first determining step S120, that the rotary unit 140 is not operating, the supplying step S140 (described later) or the second determining step S150 (described layer) is performed.

If it is determined, in the first determining step S120, that the rotary unit 140 is operating, the controlling step S130 is performed by the control unit 160 to move the rotary unit 140 to the base position, that is, the first position P1.

If a pet enters in a state in which the rotary unit 140 is operating, a pet safety problem may occur. If a pet is sensed in a state in which the rotary unit 140 is operating, the controlling step S130 is performed to move the rotary unit 140 to the base position, that is, the first position P1, and thus, the above-described problem may be effectively prevented.

If a weight equal to or less than a second set value is applied to the load cell unit 170 in a state in which no pet is sensed in the sensing step S110, the supplying step S140 is performed as shown in FIG. 10 by the control unit 160, the rotary unit 140, and the supply unit so as to supply the solid material to the bed unit 120.

That is, the supplying step S140 is a step which is performed when a pet leaves the case unit 110 after the pet defecates in the bed unit 120, and as shown in FIG. 8, the control unit 160 places the rotary unit 140 at the second position P2 to perform the supplying step S140. Here, the second set value may correspond to the weight of the solid material to be basically accommodated in the bed unit 120.

If it is determined, in the first determining step S120, that the rotary unit 140 is not operating, the second determining step S150 is performed by the control unit 160 to determine whether a weight equal to or greater than a first set value is applied to the load cell unit 170 as shown in FIG. 9.

That is, the second determining step S150 is a step of determining whether a pet has entered the bed unit 120 for defecation. In addition, here, the first set value may correspond to the sum of the weight of the solid material and the weight of a pet which are applied to the bed unit 120.

In the second determining step S150, if it is determined that a pet is in the bed unit 120, the third determining step S160 (described later) is performed.

If it is determined, in the second determining step S150, that a weight equal to or greater than the first set value is applied to the load cell unit 170 as shown in FIG. 9, the third determining step S160 is performed by the control unit 160 to determine whether a weight equal to or less than the first set value is applied to the load cell unit 170.

That is, the third determining step S160 is a step of determining whether the pet has left the bed unit 120 after defecation.

If it is determined, in the third determining step S160, that the pet has left the bed unit 120, the operating step S170 (described later) is performed to remove excrement of the pet.

If it is determined, in the third determining step S160, that a weight equal to or less than the first set value is applied to the load cell unit 170, the operating step S170 is performed by the control unit 160 and the rotary unit 140 to operate the rotary unit 140 as shown in FIG. 11.

That is, the operating step S170 is a step of moving excrement to the accommodation unit 130 when the pet has left the bed unit 120 after defecation.

In the operating step S170, the control unit 160 controls the rotary unit 140 to move the rotary unit 140 to the third position P3, and thus excrement is moved from the bed unit 120 into the accommodation unit 130.

Meanwhile, it is preferable to perform the operating step S170 after the pet has completely left the case unit 110 through the entrance (io), and thus it is preferable to perform the operating step S170 after a certain period of time, that is, a period of time corresponding to a third set value from the finish of the third determining step S160.

As described above, according to the embodiments of the present invention, the method S100 for processing pet excrement using the pet excrement device, which includes the sensing step S110, the first determining step S120, the controlling step S130, the supplying step S140, the second determining step S150, the third determining step S160, and the operating step S170, may provide the effect of automatically removing excrement, supplying a solid material, and accommodating excrement by simply rotating the rotary unit 140. Therefore, the effect of effectively and easily removing pet excrement may be obtained.

In the above descriptions of the embodiments, although all the elements are described as being combined as one entity or operating in combination, the present invention is not limited to the embodiments. For example, all the elements may be selectively combined as at least one entity and may then be operated within the scope of the present invention.

Furthermore, in the above description, the terms "includes," "constituted by" and/or "have" specify the presence of stated elements, but do not preclude the presence or addition of one or more other elements unless otherwise specified. All terms, including technical and scientific terms, have the same meanings as commonly understood by those of ordinary skill in the art unless otherwise defined. Generally used terms such as those defined in dictionaries may be interpreted to have the same meanings as the contextual meanings in the relevant field of art, and are not to be interpreted to have ideal or excessively formal meanings unless clearly defined in the present invention.

The above descriptions of technical ideas of the present invention are merely examples, and those of ordinary skill in the art could make various modifications and variations without departing from the scope of the present invention.

Therefore, the embodiments of the present invention are for illustrative purposes only and are not intended to limit the scope of the present invention. The scope of the present invention should be construed according to the appended claims, and it should be understood that all technical ideas equivalent to those described above are within the scope of the present invention.

I claim:

1. A method of discharging pet excrement by a pet excrement device, the method comprising:
   sensing a presence of a pet;
   in response to the sensing of the presence of the pet, determining whether a rotary unit is operating;
   in response to determining that the rotary unit is not operating, determining whether a weight equal to or greater than a first set value is applied to a load cell;
   in response to determining that a weight equal to or greater than the first set value is applied to the load cell, determining whether a weight equal to or less than the first set value is applied to the load cell; and
   in response to determining that a weight equal to or less than the first set value is applied to the load cell, operating the rotary unit,
   wherein in response to no pet being sensed in the sensing of the presence of the pet, the method further comprises supplying a solid material to a bed in response to determining that a weight equal to or less than a second set value is applied to the load cell.

2. The method of claim 1, wherein in response to determining, in the sensing of the presence of the pet, that the rotary unit is operating, the method further comprises controlling a position of the rotary unit to a basic position.

3. The method of claim 1, wherein the sensing of the presence of the pet is performed by using infrared rays.

4. The method of claim 1, wherein the operating of the rotary unit is performed after a period of time equal to or longer than a third set value elapse.

* * * * *